Oct. 1, 1968   H. C. CLARK   3,403,940
SAW ATTACHMENT FOR EXCAVATOR BUCKET
Filed Dec. 9, 1966   2 Sheets-Sheet 2
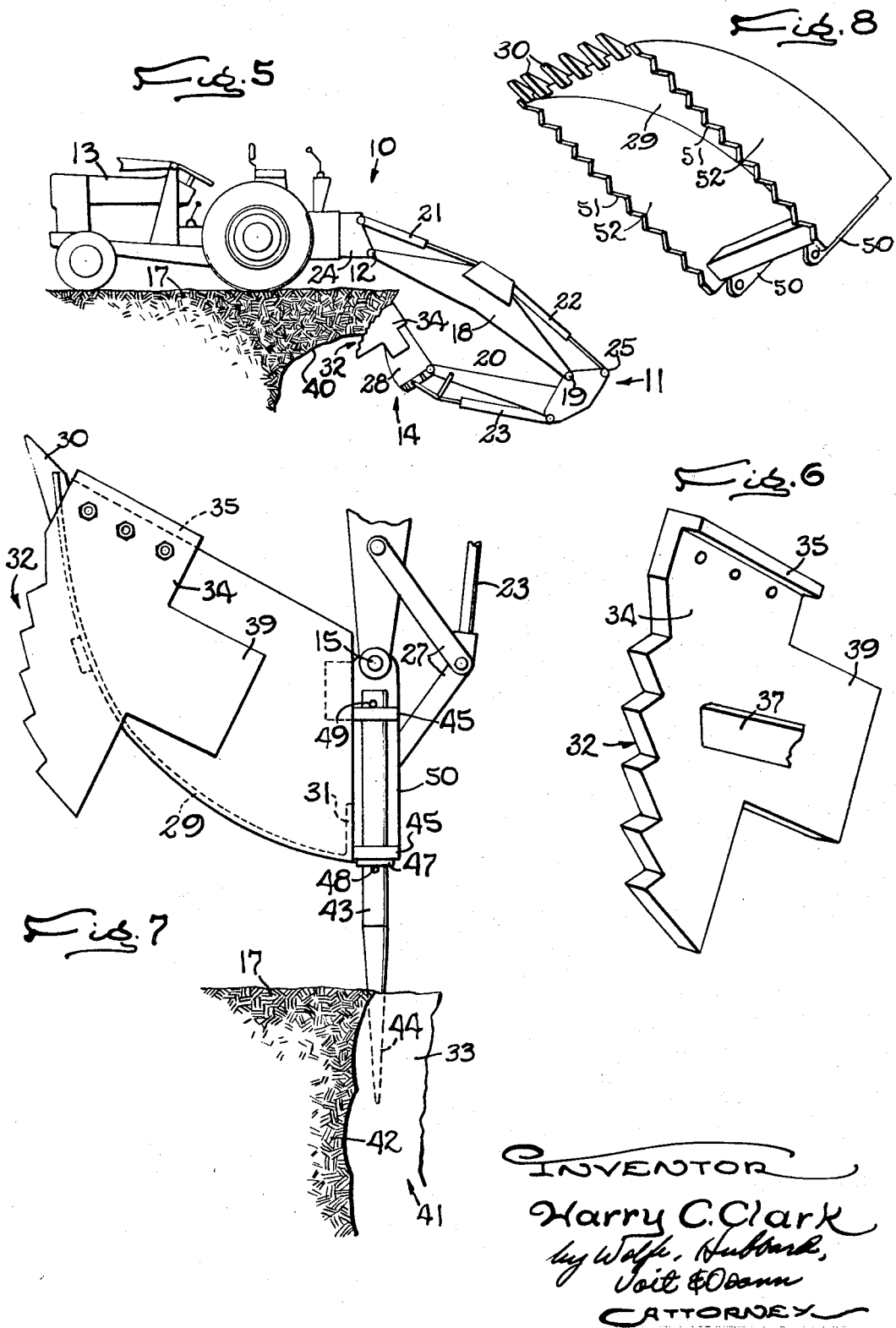

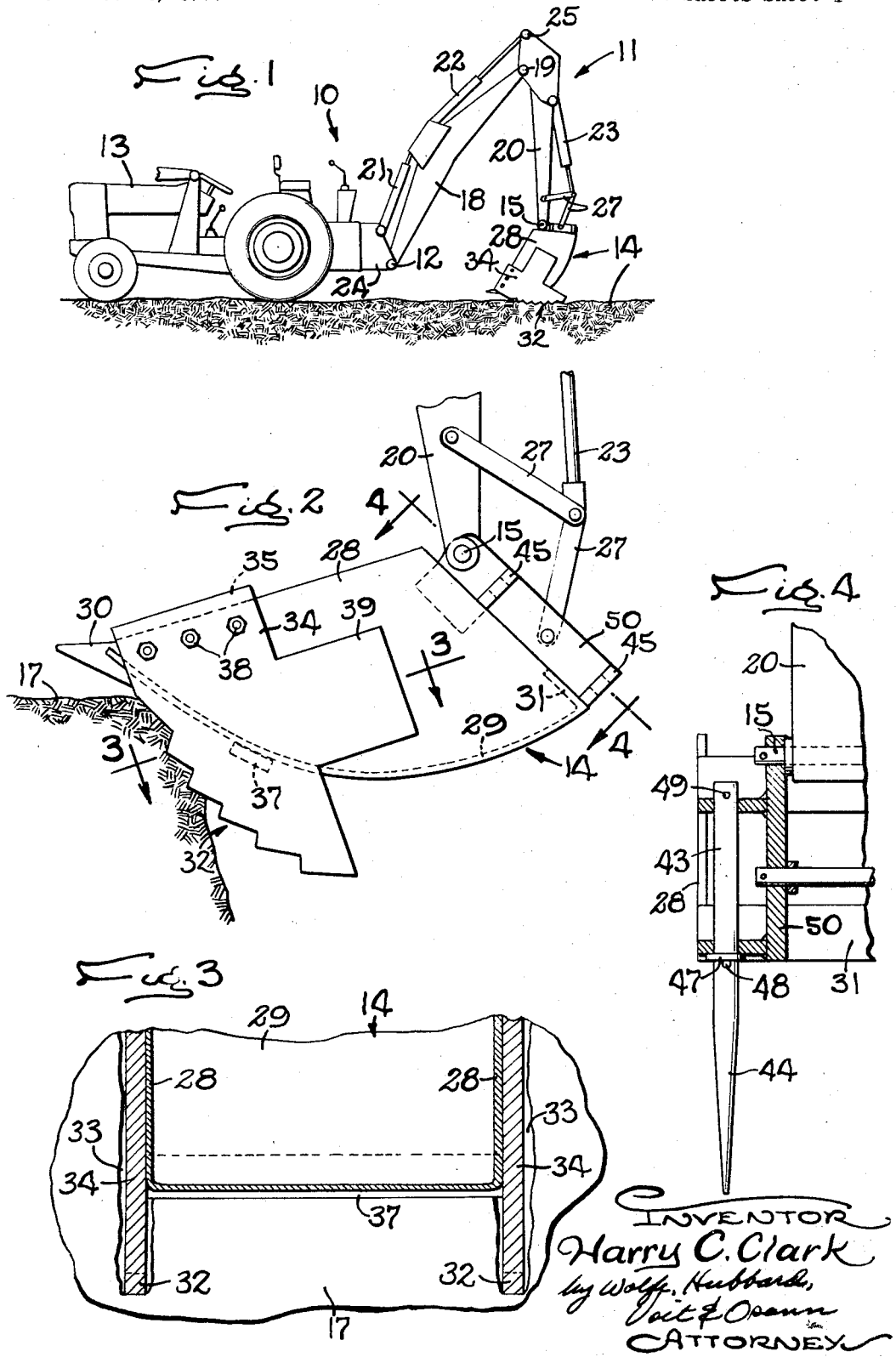

United States Patent Office

3,403,940
Patented Oct. 1, 1968

3,403,940
SAW ATTACHMENT FOR EXCAVATOR BUCKET
Harry C. Clark, 226 W. Perry St., Belvidere, Ill. 61008
Filed Dec. 9, 1966, Ser. No. 600,412
8 Claims. (Cl. 299—26)

ABSTRACT OF THE DISCLOSURE

An excavator having a bucket with spaced saw blades formed on or attached to the bucket to cut into frozen earth and the like during back and forth movement of the bucket, and with a wedge-shaped spike on the bucket for breaking off the earth upon completion of the sawing operation.

Background of the invention

This invention relates to excavating and, more particularly, to the removal of frozen earth and the like preparatory to digging a trench or other excavation. The present practice is to use a jack hammer or other special equipment to break out the frost, much in the way that concrete is removed, so that the excavator can reach the softer soil below.

Summary of the invention

The object of this invention is to facilitate the rapid removal of frozen earth without special equipment, and the invention resides in the provision of saws on the excavator bucket positioned to cut spaced kerfs in frozen soil during back and forth motion of the bucket, and in providing a wedge-shaped spike on the bucket for breaking out tongues of soil between the kerfs.

Brief description of the drawings

FIGURE 1 is a side elevational view of an excavator with a bucket embodying the novel features of the present invention.

FIG. 2 is an enlarged fragmentary view similar to a portion of FIG. 1 with the bucket in the normal sawing position.

FIG. 3 is a fragmentary cross-sectional view taken substantially along the line 3—3 of FIG. 2.

FIG. 4 is a fragmentary cross-section taken substantially along the line 4—4 of FIG. 2.

FIG. 5 is a view similar to FIG. 1 showing another position of the excavator.

FIG. 6 is an enlarged perspective view of the preferred saw.

FIG. 7 is an enlarged view similar to FIG. 2 with the parts in moved positions and showing the frost-breaking spike.

FIG. 8 is a fragmentary perspective view of a modified form of the invention.

Detailed description

As shown in the drawings for purposes of illustration, the invention is embodied in an excavator 10 of the so-called back-hoe type in which an articulated boom 11 is pivoted at 12 on the rear end of a tractor 13 and carries a bucket 14 that is pivoted at 15 on the free end of the boom for digging engagement with the earth 17. The general construction and operation of such excavators are well known, and thus will be described only briefly herein.

The boom 11 is formed by an elongated main arm or mast 18 fulcrumed at one end on the pivot 12 for vertical swinging and having a horizontal pivot 19 at its free end supporting the second arm or section 20 of the boom. The bucket, in turn, pivoted at 15 on the free end of the second section, this pivot also being horizontal.

With the foregoing arrangement, vertical movement of the bucket 14 is accomplished with the usual operating mechanism including three hydraulic cylinders 21, 22 and 23. The cylinder 21 acts between the platform 24 on the rear of the tractor and the central portion of the mast 18 to raise and lower the mast, and the cylinder 22 acts between the mast and a pivot 25 on the adjacent end of the section 20 to swing the latter back and forth. The cylinder 23 is fastened at one end to the upper portion of the section 20 and at the other end to a toggle linkage 27 which acts on the bucket to rock the latter about its pivot. To swing the boom from side to side, the operating mechanism also includes a power actuator (not shown) for rotating the platform 24 about a vertical axis.

The usual bucket 14 is formed by two sidewalls 28 disposed in vertical planes, a generally rectangular rear side, and a curved bottom plate 29 terminating at the front side of the bucket in a digging edge that usually is provided with spaced, forwardly extending teeth 30. The top of the bucket is open and the rear side is partially closed by an upturned flange 31 along the rear edge of the bottom plate.

During the winter months when the earth freezes and forms a hard crust referred to as "frost," it is necessary to remove the crust at the beginning of any excavating operation. When the crust is only a few inches thick, conventional excavators can break out the frost without much difficulty, but deeper frost, for example, from ten inches to thirty inches thick, has had to be removed slowly and expensively with jack hammers or other special equipment before the excavators can proceed with trenching or other excavation.

In accordance with the present invention, two saws 32 are mounted on the excavator bucket 14 in two parallel planes spaced apart a distance approximately equal to the width of the bucket and are positioned for cutting engagement with the earth 17 during back and forth movement of the bucket by the normal operating actuators of the excavator 10. With this arrangement, the operator is able to saw two parallel kerfs 33 through the frost and quickly break out the resulting tongue of frost, thereby expediting the removal of frost during the excavating operation.

In the preferred form of the invention shown in FIGS. 1–7, the saws 32 are formed on heavy metal plates 34 fastened to the outer sides of the sidewalls 28 of the bucket and projecting downwardly beyond the bottom wall 29. Herein, the upper edges of the plates are formed with inturned ribs 35 (see FIG. 6) overhanging the upper edges of the sidewalls of the bucket, and are connected across the bottom of the bucket by a crossbar 37 welded to the inner sides of the saws and abutting against the underside of the bucket. Bolts at 38 fasten the saw plates removably to the sides of the bucket.

To form the saws 32, the front edges of the plates 34 are curved, generally on an arc concentric with the bucket pivot 15, and are notched or serrated to form a series of saw teeth along these font edges, the two saws being equally spaced from the pivot for simultaneous engagement with the earth 17 during rocking of the bucket about its pivot. It will be seen that the free end of each saw plate tapers to a point which preferably is on the order of 12–18 inches below the bottom wall of the bucket. Rectangular lugs 39 abut against the sides of the bucket and serve as braces.

The crossbar 37 between the saw plates 34 joins the latter permanently together for handling as a unit and cooperates with the ribs 35 in facilitating the mounting and removal of the unit on the bucket 14 with the saw unit standing on the ground. The bucket may be moved in between the plates until the ribs abut against the upper edges of the sidewalls 28 and the crossbar abuts against the bottom wall 29, and the bolts 38 are inserted through alined holes in the plates and the buckets to secure the saw unit in place.

Frost removal with such a bucket 14 is accomplished by rocking the bucket back and forth about its pivot 15 while pulling the saws 32 progressively into the ground as shown in FIGS. 2 and 3, forming the two parallel slots or kerfs 33 in the surface of the soil. An initial entry hole should be opened in a conventional manner to permit the back-hoe to pull the bucket substantially horizontally through the earth. It has been found that, contrary to what might be expected, the teeth do not become plugged or filled with frozen earth during sawing. This is attributed to the fact that sufficient heat is generated by the rubbing friction to melt the earth between the teeth. When working in frost of a greater depth than the "reach" of the blades, it is possible to operate from beneath the frost, generally as shown to FIG. 5, after opening an initial entry hole in a conventional manner and digging out a trench beneath the frost as at 40. Then the bucket is inserted in the manner shown in FIG. 5 with the saws pressed against the underside of the frost to cut upwardly extending saw kerfs as shown at 41 in FIG. 7. All sawing forces are applied through the ribs 35 and the crossbar 37, the bolts 38 serving only to hold the unit in place.

It will be evident that, upon completion of a sawing operation, what remains is an elongated tongue of frozen earth bounded by the two parallel saw kerfs and integrally joined at one end to the soil, as shown at 42 in FIG. 7. If the frost is a relatively shallow depth, perhaps as thick as twenty-four inches, it may be most practical to break off this tongue simply by pulling up on it with the bucket. With thick frost, however, breaking off such tongues is greatly facilitated by an elongated spike 43 having a tapered or wedge-shaped free end portion 44 and mounted on the bucket to be pushed into the tongue to split it away.

For this purpose, the spike 44 herein is mounted removably on the rear end of the bucket on a bracket formed by a pair of parallel plates 45 (FIGS. 2, 4 and 7) projecting outwardly from the rear end, perpendicular thereto, and having two alined holes through which the upper, shank portion of the spike extends. A collar 47 is held on the spike beneath the bracket by a pin 48 and another pin 49 is inserted through the spike above the bracket to mount the spike in place. Preferably, the bracket is attached to one of the usual upright bars 50 on the rear side of the bucket, with the longitudinal axis of the spike extending radially away from the pivotal axes for optimum force application. Using the spike, it should be possible to break off a tongue as much as thirty inches thick. With heavier machinery, of course, greater forces can be exerted.

In the modified form shown in FIG. 8 saw teeth 51 are formed integrally with the sidewalls 52 of the bucket 53 by notching the free upper edges of the sidewalls. This form has the advantage of cheapness and permanent, out-of-the-way mounting of the saws, but has an inherent limitation as to sawing capacity in that the tongue must fit into the bucket during sawing.

From the foregoing, it will be seen that the present invention provides an effective tool for power-removal of frost in a much quicker and convenient manner than previously has been possible, and provides this tool in a relatively inexpensive manner by modifying existing equipment for the new purpose. Moreover, the frost spike or wedge expedites removal of frost tongues after the sawing is completed.

I claim as my invention:

1. In an excavator having an articulated boom, a digging bucket pivotally mounted on the free end of said boom, and operating mechanism for moving said boom and said bucket to perform an excavating operation, the improvement comprising a pair of saws fixedly mounted on said bucket in two parallel planes spaced apart a distance approximately equal to the width of the bucket, said saws having rows of cutting teeth and being positioned on said bucket for sawing engagement with the earth during back and forth movement of the bucket by said operating mechanism thereby to cut spaced kerfs through frozen earth and the like preparatory to excavation.

2. The combination defined in claim 1 in which said bucket is formed with upright sidewalls, a digging edge, and an open front side, and said saws are fast on said sidewalls adjacent said digging edge and project downwardly from the bucket in said planes.

3. The combination defined in claim 2 in which said saws are plates each having a rib overhanging and abutting against the upper edge of the adjacent sidewall, said plates being joined together by a cross member abutting against the underside of said bucket whereby sawing forces are applied to the plates through said ribs and said cross member.

4. The combination defined in claim 3 in which said plates are detachably secured to said sidewalls by bolts, and said bucket is movable freely into and out of the unit formed by said plates and said cross member when said bolts are removed.

5. The combination defined in claim 2 in which each saw has an arcuate row of teeth for engagement with the earth, the arc of said teeth being concentric with the pivot of said bucket for back and forth oscillation about said pivot while in engagement with the earth.

6. The combination defined in claim 5 further including an elongated spike on said bucket having wedge-shaped free end adapted to be pushed into the earth after said kerfs are formed thereby to break off the tongue of earth between the kerfs.

7. The combination defined in claim 6 including means detachably mounting said spike on the rear side of said bucket.

8. The combination defined in claim 1 in which said bucket is formed with a digging edge, upright sidewalls disposed, in said planes, and an open upper side, said saws comprising two rows of teeth formed on the free upper edges of said sidewalls.

References Cited
UNITED STATES PATENTS

| | | | |
|---|---|---|---|
| 1,676,097 | 7/1928 | Lang | 299—67 |
| 2,086,573 | 7/1937 | Osgood | 299—67 X |
| 2,470,779 | 5/1949 | Lankovski et al. | 214—145 |
| 2,840,931 | 7/1958 | Appel | 37—117.5 |
| 2,969,966 | 1/1961 | Matheis | 299—26 |

HUGO O. SCHULZ, *Primary Examiner.*